(12) United States Patent
Taylor

(10) Patent No.: US 9,004,012 B2
(45) Date of Patent: Apr. 14, 2015

(54) REUSABLE PET CHEW TOY WITH TREAT COMPARTMENT

(75) Inventor: Dale Taylor, Centennial, CO (US)

(73) Assignee: The Kyjen Company, Inc., Centennial, CO (US)

( * ) Notice: Subject to any disclaimer, the term of this patent is extended or adjusted under 35 U.S.C. 154(b) by 0 days.

(21) Appl. No.: 13/065,433

(22) Filed: Mar. 22, 2011

(65) Prior Publication Data

US 2012/0240866 A1 Sep. 27, 2012

(51) Int. Cl.
*A01K 15/02* (2006.01)
*A01K 29/00* (2006.01)
*A01K 11/00* (2006.01)

(52) U.S. Cl.
CPC .................... *A01K 15/026* (2013.01)

(58) Field of Classification Search
CPC ..... A01K 15/025; A01K 15/026; A01K 5/00; A01K 1/033; Y10S 426/805
USPC .................. 119/707, 709, 710, 711
See application file for complete search history.

(56) References Cited

U.S. PATENT DOCUMENTS

| | | | | | |
|---|---|---|---|---|---|
| 3,755,926 | A | * | 9/1973 | Schonbrun | 36/125 |
| 3,837,546 | A | * | 9/1974 | Westermann | 224/429 |
| 4,041,621 | A | * | 8/1977 | Anderson | 36/122 |
| 4,131,713 | A | * | 12/1978 | Barta et al. | 428/364 |
| 4,321,888 | A | * | 3/1982 | Topliffe | 119/709 |
| D287,988 | S | * | 1/1987 | Billinghurst | D21/713 |
| 6,073,581 | A | * | 6/2000 | Wang | 119/51.01 |
| 6,098,571 | A | * | 8/2000 | Axelrod et al. | 119/707 |
| 6,223,693 | B1 | * | 5/2001 | Perlberg et al. | 119/707 |
| 6,277,420 | B1 | * | 8/2001 | Andersen et al. | 426/92 |
| 6,425,348 | B1 | * | 7/2002 | Twain | 119/482 |
| 6,584,938 | B2 | * | 7/2003 | Sherrill et al. | 119/710 |
| D497,701 | S | * | 11/2004 | Tepper et al. | D1/120 |
| 7,367,283 | B2 | * | 5/2008 | Aboujaoude et al. | 119/707 |
| 7,691,426 | B2 | * | 4/2010 | Axelrod et al. | 426/132 |
| 8,215,267 | B2 | * | 7/2012 | Axelrod et al. | 119/710 |
| 8,312,844 | B2 | * | 11/2012 | Mann | 119/709 |
| 2005/0064019 | A1 | * | 3/2005 | Hill et al. | 424/442 |
| 2005/0147719 | A1 | * | 7/2005 | Hill et al. | 426/132 |
| 2006/0081195 | A1 | * | 4/2006 | Jiang | 119/709 |
| 2007/0193531 | A1 | * | 8/2007 | Anderson et al. | 119/709 |
| 2011/0283955 | A1 | * | 11/2011 | Axelrod et al. | 119/710 |
| 2012/0060766 | A1 | * | 3/2012 | Brandon | 119/710 |

\* cited by examiner

*Primary Examiner* — Yvonne Abbott-Lewis

(57) ABSTRACT

The invention relates to a reusable pet chew toy made of hard rubber and rawhide laces with a compartment to accommodate treats wherein the pet must chew through rawhide laces to break open the compartment to obtain the treat.

4 Claims, 4 Drawing Sheets

REUSABLE PET CHEW TOY WITH TREAT COMPARTMENT

FIELD

Per 37 CFR 1.125, no new matter is contained herein. The invention relates to a novel pet toy wherein the toy is comprised of a reusable outer bone-shaped casing wherein treats may be inserted and the casing is secured with an edible rawhide lacing material. The animal chews through the rawhide lacing which dissembles the outer encasing and is able to gain access to an inserted treats therein.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel method of utilizing a two-piece hard rubber outer casing which is laced together with an edible rawhide material. The animal chews through the rawhide lacing and is able to gain access to user inserted treats contained inside the outer casing which dissembles after the lacing is chewed. The outer casing is sturdy enough that it may be reused multiple times.

An issue with current rawhide type chew treats or toys for pets is that large portions of rawhide are not safe for animals as they pose a choking hazard. Typical rawhide chew toys are also large and do not utilize an encasement type method which provides stimulation whereby the pet must perform process to access the treat. The inventive chew toy only allows for small portions of rawhide to be consumed at any given time. Further, the reusable casing provides an economical way for users to utilize the chew toy over and over as users can insert treats and lace the outer casing up with provided supplemental rawhide lacing.

THE INVENTION

Summary, Objects and Advantages

Pet chew toys are in obvious abundance in this and other countries. There are pet toys which make sounds, and there are pet toys which dispense treats upon engagement of the pet's conditioning. A novel aspect of the inventive chew toy is the reusability of the outer encasement, combined with the safety of small portions of rawhide ingested thus avoiding the typical choking hazard of current rawhide chews. Further, large portions of rawhide are more difficult for animals to digest, and the inventive chew toy only allows small pieces of rawhide to be consumed.

The inventive chew toy also comes with supplemental rawhide laces so that a user may insert treats and provide the pet the toy to chew and access the treats multiple times. This provides a unique value to the inventive chew toy as opposed to current art chew toys which are one-time consumption items.

The inventive pet chew, in its preferred embodiment, utilizes a two-piece bone shaped outer casing, with holes therein to allow for lacing of small rawhide strips (laces). The rawhide laces must be soaked in water to soften them for lacing, and then the user simply inserts a treat into the casing and laces it up. The pet then has to chew through the rawhide laces to open the encasement and access the treat. This activity stimulates the pet as well as encourages memory conditioning.

Another embodiment of the inventive chew toy is a single piece hard rubber portion with rawhide lacing wherein the pet still must chew the rawhide, but does not need to access a treat inside, nor ingests large amounts of rawhide at any given time. This embodiment allows for extended stimulation of the pet as the rawhide will only become pliable on the portions the pet chews, and the remainder stays firm for further consumption. The benefit of this embodiment is the extended stimulation.

In summary, the inventive chew toy exhibits advantages and novelty over the art in that the design and functionality make this pet toy safe, stimulating, and reusable.

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in four relatively simple figures; although sufficiently complex as to illuminate to one skilled in the art of such software architecture, programming, and computer operations a viable method for making or using said invention.

Figure 1:
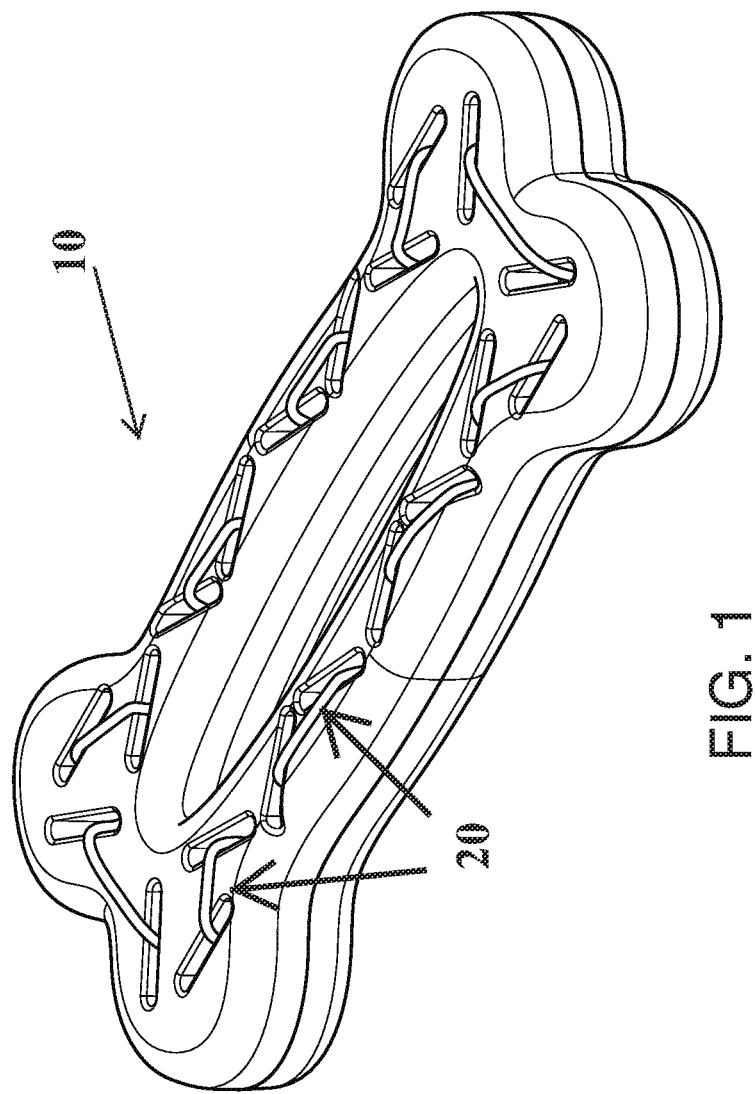
FIG. 1; depicts a perspective view of the one-piece chew toy showing lacing within the apertures.

FIG. 1 is a perspective of the one-piece chew toy 10. The apertures 20 are shown with the softened rawhide laced through the apertures. This embodiment does not come apart, but functions as a chew toy wherein the pet may consume the rawhide laces.

Figure 2:
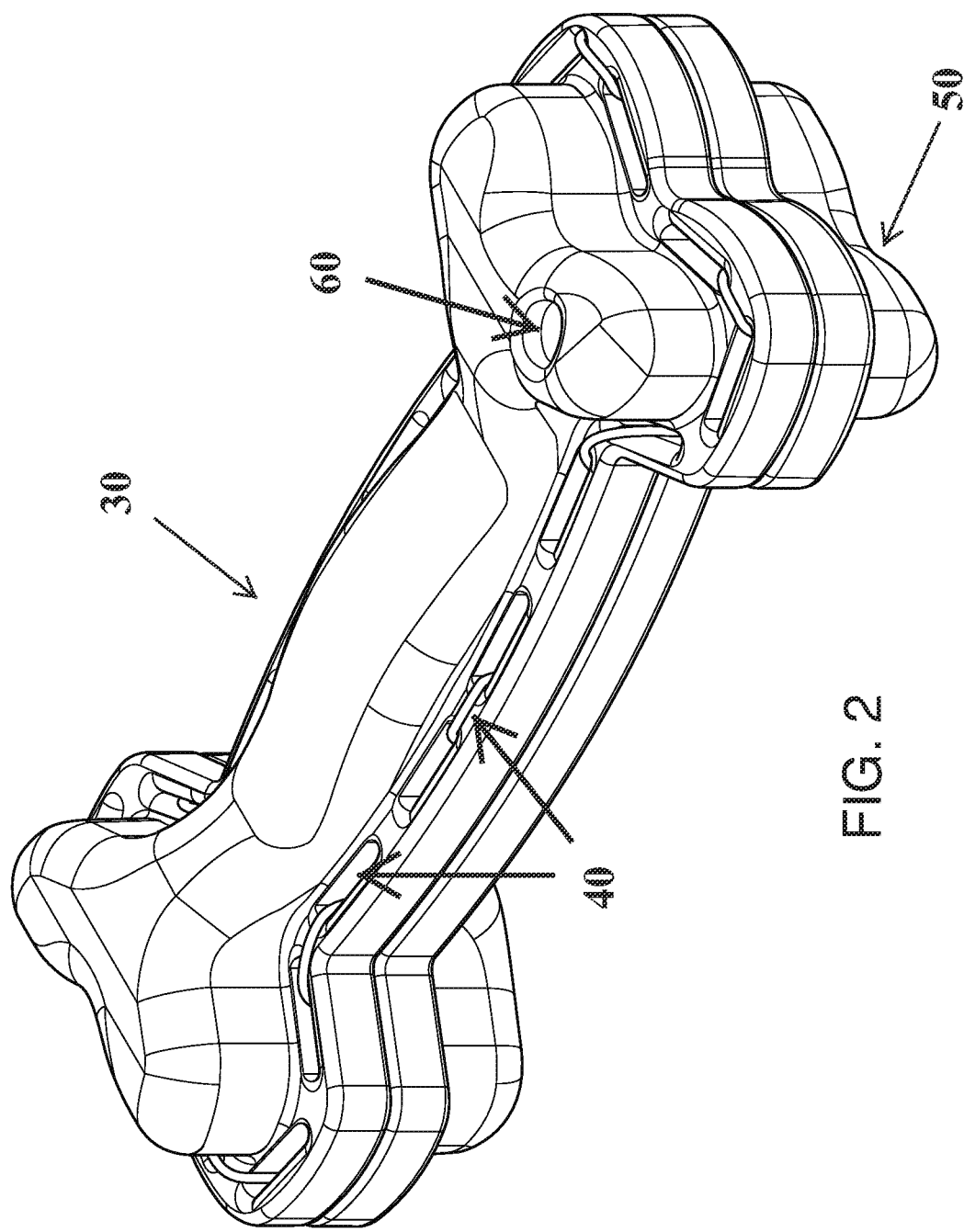
FIG. 2; illustrates the hollow molded two-piece chew toy as laced.

FIG. 2 is a perspective view of the two piece chew toy 30. The apertures for lacing 40 are clearly shown in the shape and placement so as to enable easy lacing of the rawhide strips by a user. Edible rawhide strips are laced within. The molded body 50 is evidenced in this Figure and allows for a hollow space within the two halves of the bones so that a user may insert pet treats. A scent hole 60 is located on the bone half so as to entice the pet into solving the bone "puzzle" to obtain the treats. This requires good cognitive and tactile skills which also help condition a pet's brain function and eases boredom—which animals do indeed experience.

Figure 3:
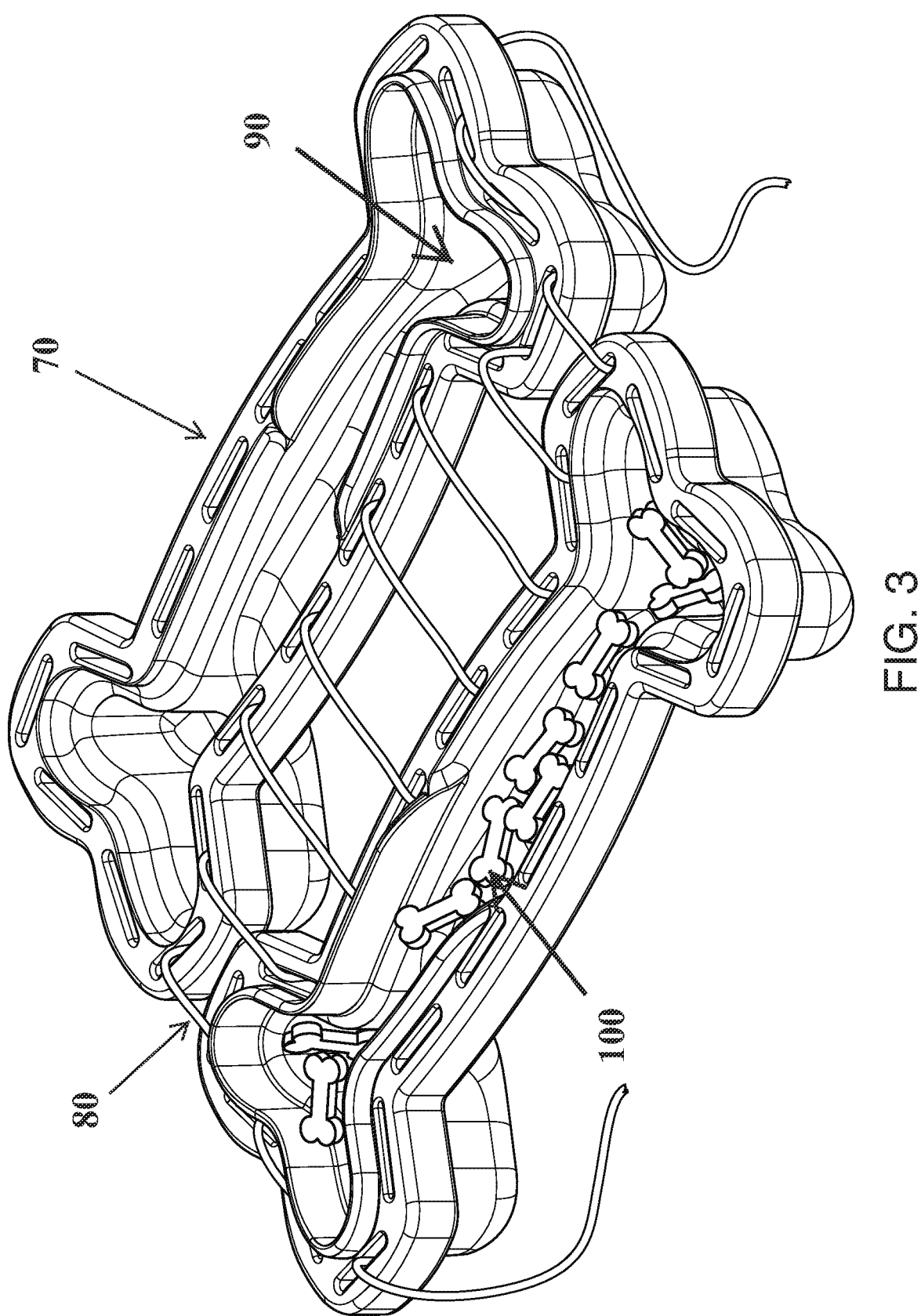
FIG. 3; is an open view of the chew toy with treats therein.

FIG. 3 is an open view of the toy illustrating the two halves 70. The rawhide lacing 80 is shown as affixing the two halves of the chew toy laced much as one would do a shoe. The molded bone halves are hollow inside 90 and are shown here with small dog treats 100 inserted. These treats entice the pet in tow way; by sound and scent. The pet develops conditioned responses to both when it has chewed the bone apart and found treats.

Figure 4:
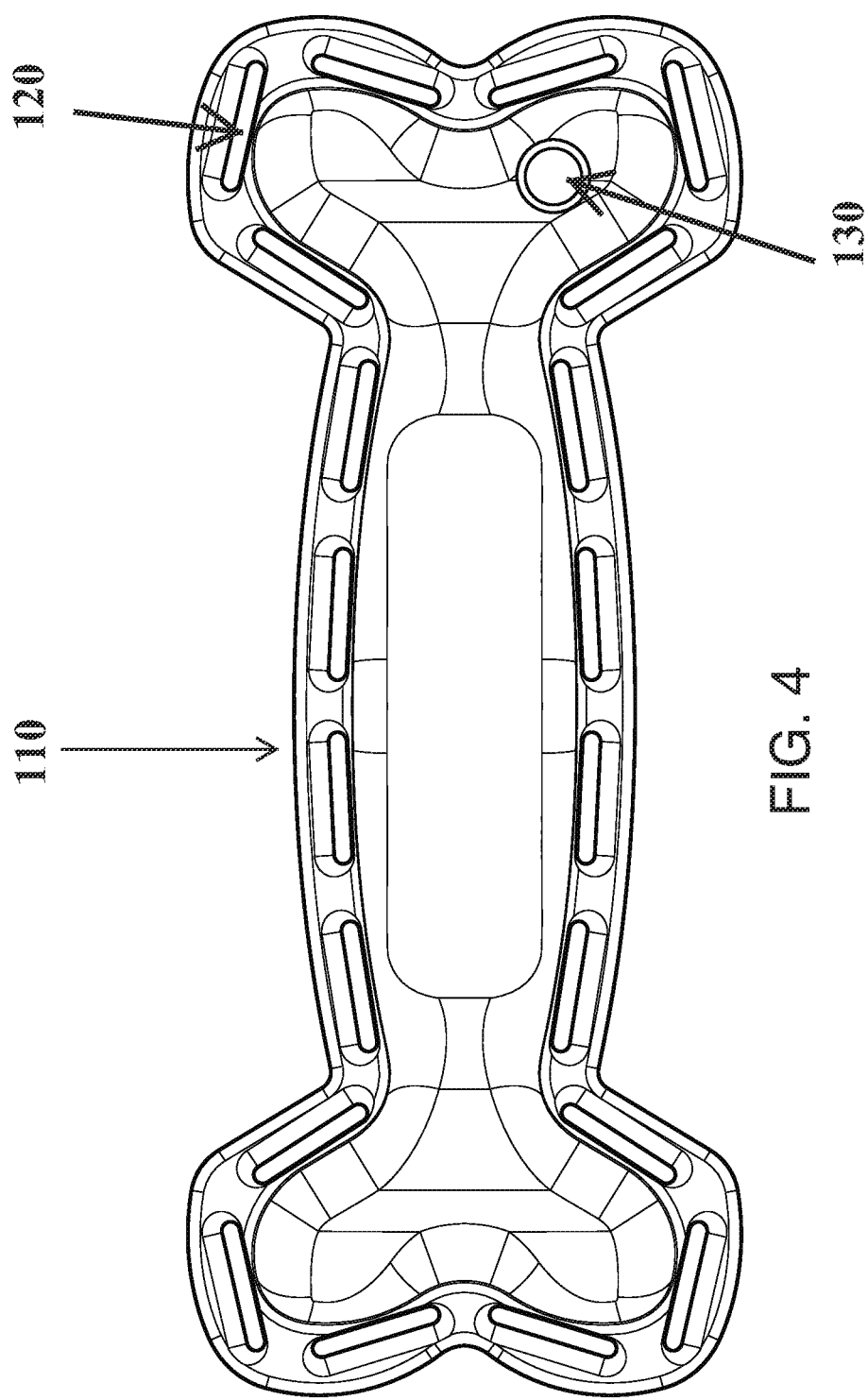
FIG. 4 is a top view of one half of the molded chew toy without lacing or items inserted.

FIG. 4 is a top view of one half of the outer encasement 110 illustrating the molded shape and providing an aerial view of the rawhide lace apertures 120 sans laces. The scent hole 130 is clearly visible in this one-half of the encasement.

The invention claimed is:

1. A reusable pet chew toy wherein a two-piece outer encasement connected together with edible rawhide strips create an openable treat compartment comprising:
   a) a two-piece hollow bone shaped encasement
   b) apertures for lacing rawhide strips through the two bone shaped encasement pieces
   c) edible rawhide strips.

2. The reusable pet chew toy of claim 1 wherein the encasement is comprised of a two-piece bone shaped hard rubber material.

3. The reusable pet chew toy of claim 1 wherein apertures are strategically located in context with one another so as to enable a user to lace softened rawhide strips through to securely connect the two bone shaped encasement pieces.

4. The reusable pet chew toy of claim 1 wherein pet treats may be inserted into the hollow encasement pieces and, once laced together, require the pet to chew the strips to release both halves of the hollow encasement.

* * * * *